May 11, 1926.

C. L. BEST 1,584,425

POWER TRANSMISSION FOR VEHICLES

Filed June 4, 1921  3 Sheets-Sheet 2

Witness:
Jas E Hutchinson

Inventor:
Clarence Leo Best,
By
Nilaus Nielans
Attorneys

May 11, 1926.
C. L. BEST
1,584,425
POWER TRANSMISSION FOR VEHICLES
Filed June 4, 1921     3 Sheets-Sheet 3
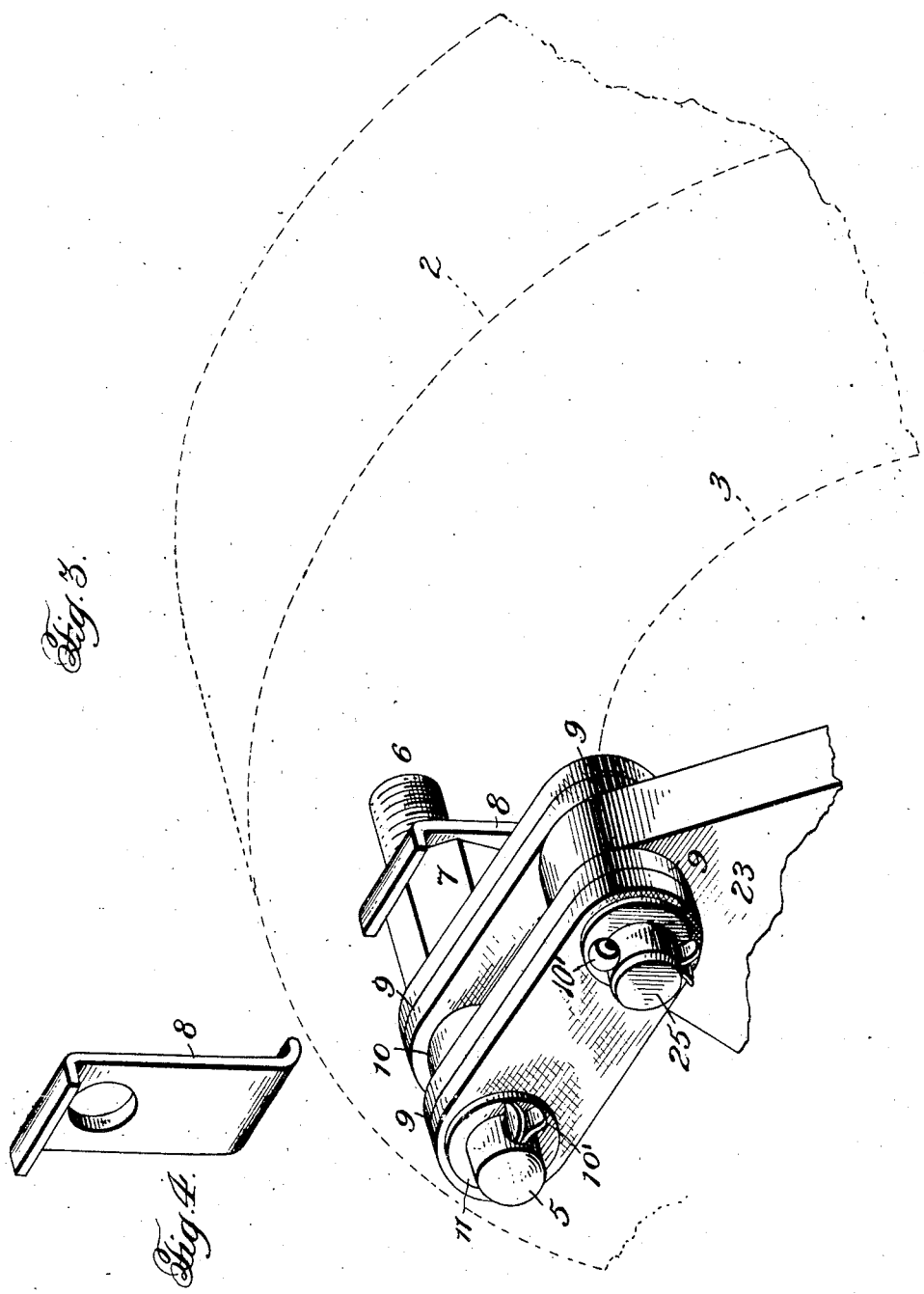
Witness:
Jas. E. Hutchinson
Inventor:
Clarence Leo Best,
By Milans & Milans
Attorneys Patented May 11, 1926.

1,584,425

UNITED STATES PATENT OFFICE.

CLARENCE LEO BEST, OF SAN LEANDRO, CALIFORNIA, ASSIGNOR, BY MESNE ASSIGNMENTS, TO CATERPILLAR TRACTOR CO., OF SAN LEANDRO, CALIFORNIA, A CORPORATION OF CALIFORNIA.

POWER TRANSMISSION FOR VEHICLES.

Application filed June 4, 1921. Serial No. 475,078.

This invention relates to certain new and useful improvements in clutches, and deals particularly with that type used or employed in connection with power transmission in motor vehicles. Clutches of various constructions are commonly used in vehicle driving systems and are usually inserted in the system between the engine or drive shaft and the transmission or driven shaft. Serious difficulty is encountered in properly aligning the drive and driven shafts upon the installation of the motor within the chassis of the vehicle. This aligning proposition is absolutely essential owing to the rigid connection between certain portions of the clutch and the drive shaft on one hand and the clutch and the driven shaft on the other hand. This rigid form of construction is usually subjected to great strains caused by the tendency of the driven shaft to vibrate relative to the drive shaft during the usage of the vehicle. This vibration is intensely present in tractor constructions, wherein the vehicle is constantly traveling over rough or uneven ground, and it is this latter type of vehicle to which the present form of connection is applied, although not limited thereto.

It is therefore the main object of the present invention to provide a power transmission for vehicles, involving the use of a drive and a driven shaft with a clutch interposed therebetween, and a connection between the parts to permit relative independent movements of one shaft to the other at the clutch point.

A further aim of the invention resides in the novel manner of mounting the revolvable clutch ring within the coactive part of the clutch so that the former is maintained in its highest state of efficiency to perform the function incidental to this particular part of the device.

A further purpose of the invention is the provision of a novel construction of a transmission mechanism which, as a whole, comprises a few parts, inexpensive to make, which perform their function with facility and ease of operation and will successfully withstand the more or less rough usage to which such apparatuses are likely to be subjected.

In the accompanying drawings, while there is shown a specific form of friction clutch, it is to be understood that this embodiment is used merely as illustrative of the present invention. Other forms of clutches may, if desired, be inserted in place of the type shown.

Similar letters of reference indicate like parts throughout the several views, in which—

Fig. 3 is a perspective view of one of the connecting links employed between the drive and driven shafts; and Fig. 4 is a perspective view of the stud locking plate.

Figure 1:
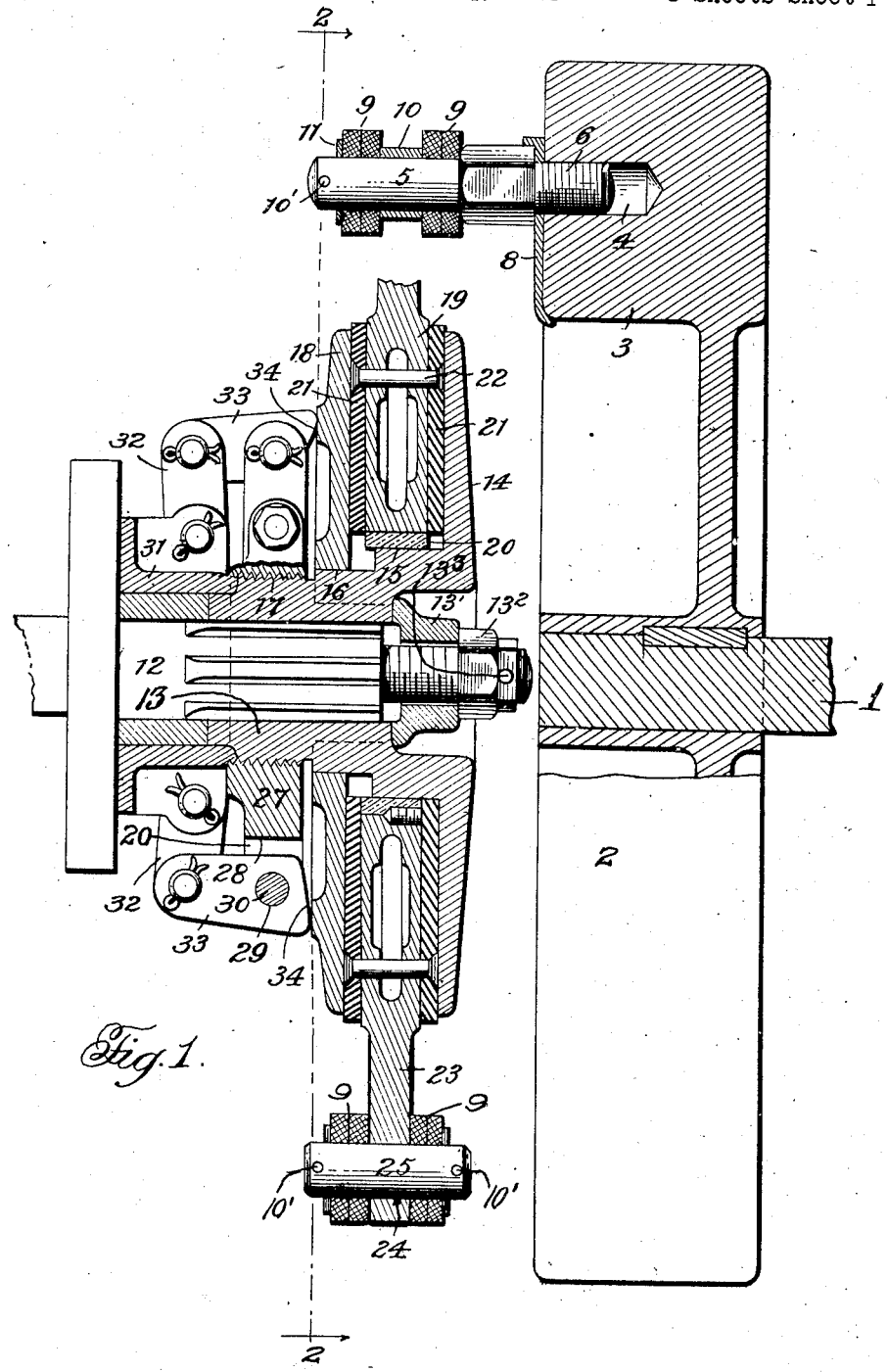
Fig. 1 is a longitudinal view, partly in section, showing an interposed clutch arranged between the drive and transmission shafts.
Figure 2:
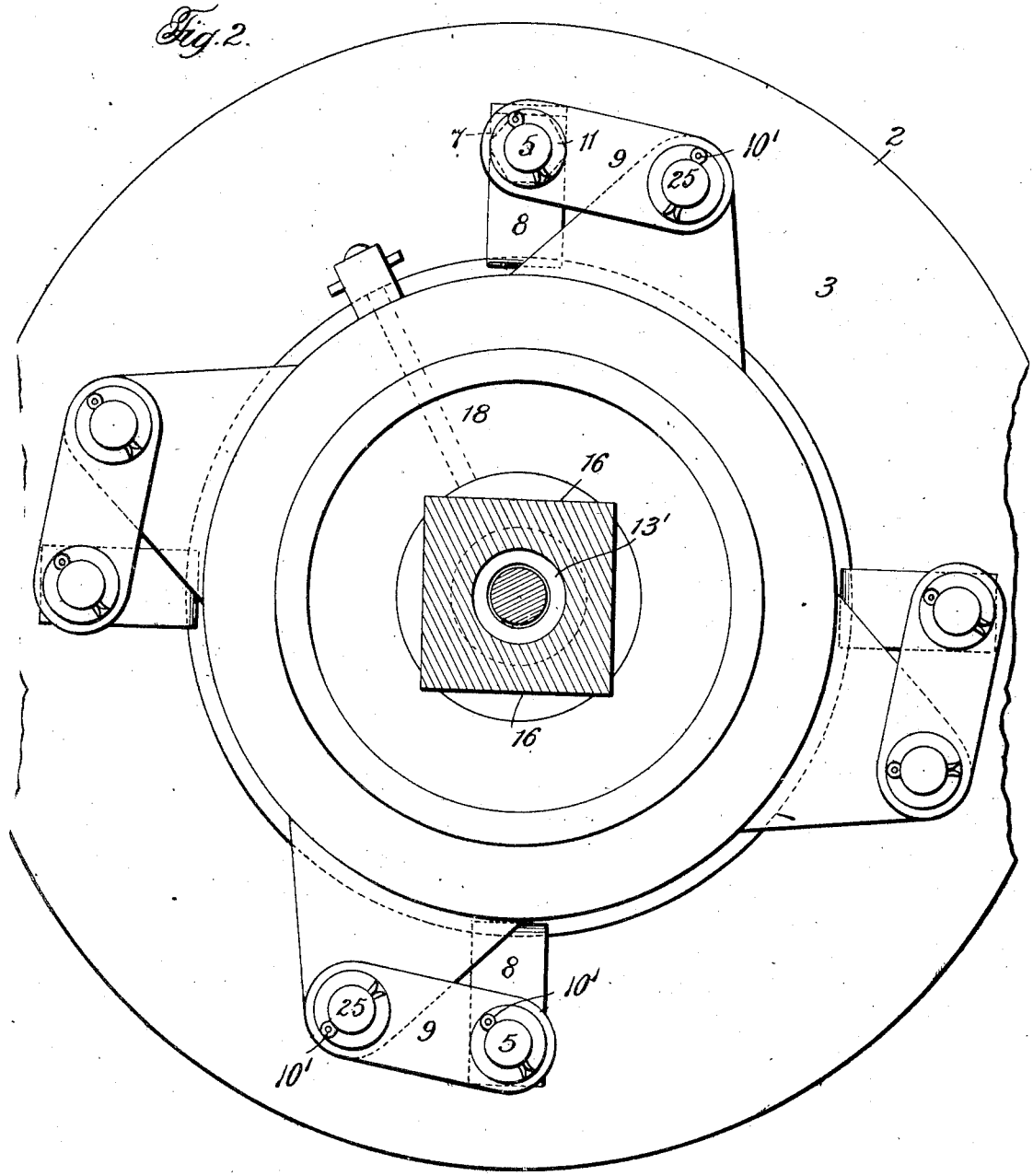
Fig. 2 is a transverse section taken on the line 2—2, of Fig. 1.

Referring more in detail to the drawings, 1 indicates the drive shaft of the vehicle, and 2 the fly-wheel secured to the end of said drive shaft. The fly-wheel 2, as shown in the present case, is provided with a thickened peripheral rim portion 3 which has through one face thereof at suitably spaced intervals thereabout screw-threaded bores indicated at 4. Secured within the bores 4 are studs indicated at 5, each stud having its inner end externally threaded as indicated at 6. Intermediate the ends of each stud there is provided an enlarged portion having a multiplicity of flattened sides as illustrated at 7. This enlarged portion is adapted to limit the inward movement of the stud within the bore 4, and the flattened sides 7 are arranged to constitute a locking face for the stud. In order that the stud may be securely held in its desired position, a flexible locking key 8 is used. This key is apertured to permit the passage of the threaded end 6 of the stud 5, and extends slightly above the enlarged portion of said stud. After the stud is inserted within the bore 4 to the desired extent, the upper end of the flexible member is bent downward into engagement with one of the flattened surfaces 7 of the enlargement. The lower portion of the flexible member is also bent around the rim portion of the fly-wheel.

Pivotally secured to the outwardly-extending portions of the studs 5 are links indicated at 9, 9. These links may be of any suitable construction, but in the present instance it is desirable that their composition be of what is known as thermoid. These links are suitably held apart by a spacer indicated at 10 and are held in position on the stud 5 by means of the cotter pin illustrated at 10' which in turn rests against a washer 11.

Rigidly keyed to the transmission shaft 12 is a hub portion 13 which has a vertically upstanding flange 14. This hub portion 13 is held upon the transmission shaft 12 through the employment of a spanning member 13', nut 13², and cotter pin 13³. The hub portion 13 inwardly of the flange 14 is provided with a bearing portion 15, and further reduced portion 16, and an inwardly threaded end 17. The stepped portion 16 is provided with a square shoulder upon which the shiftable ring 18 of the clutch is mounted. Arranged between the vertical flange 14 and the movable ring 18 is a revolvable clutch ring indicated at 19. This ring 19 has fixed to its inner end a graphite bronze bushing designated at 20, which bushing is adapted to have a bearing upon the bearing portion 15 of the hub 13. The graphite bronze bushing 20 is composed of metal alloys such as copper, tin and lead and has the characteristics of being able to perform its function without distortion, it will not heat readily during usage, is easily worked or formed into castings in the foundry, also the friction has little wearing effect thereon and its wear, if any, is extremely slow. The side faces of the revolvable ring 19 are covered with suitable clutch linings, as illustrated at 21, 21. These linings are adapted to be secured to the opposite faces of the clutch ring 19 in any suitable manner, but preferably by cross rivets as indicated at 22. The revolvable clutch ring 19 at certain intervals about its periphery is provided with lug portions 23 which are apertured as at 24 to receive cross bolts 25. The opposite ends of the links 9, 9 are connected to the bolts 25 and are locked in position thereon by the use of cotter pins or similar fastening means as indicated at 10', 10'.

Threadedly engaged over the inner portion 17 of the hub 13 is a ring member 27 having a plurality of upstanding bifurcated arms 28. These arms are transversely apertured as illustrated at 29 to receive a cross pin bearing as illustrated at 30.

Slidably mounted on the transmission shaft adjacent the inner end of the hub portion 13 is a shifting collar 31 which is adapted to be controlled through any desirable system of levers extending to the control point of the vehicle. Pivotally connected to the shifting collar 31 is a plurality of links indicated at 32. These links are in turn pivotally connected with dogs 33 which are mounted upon the cross bolts 30 in the bifurcated arms 28. The free ends of the dogs 33 are bevelled as indicated at 34 and are adapted to coact with the shiftable ring 18 of the clutch to cause an inward movement thereof.

In order that the graphite bronze bushing be well supplied with lubricant, it is desirable that a vertical oil passage be formed in the revolvable ring 19, the outer end of which passage is covered by an "alemite" type of bearing as shown in the Gullborg Patents Nos. 1,307,734 and 1,316,714.

The operation of the type of construction illustrated will be as follows:—The revolvable clutch ring being connected to the drive shaft of the engine through the fly wheel and the link construction as shown, will enable the drive shaft and the driven shaft to have relative independent vertical movements or vibrations which will be caused during the movement of the vehicle over any rough or uneven stretch of ground. The freedom of movement between these parts is permitted by the pivotal connection which permits the shafts to operate even if they are not in absolute alignment when the motor is installed within the engine frame. The operation of the clutch, as shown, is well known in this art, and briefly stated, will be as follows:—The movement of the shiftable sleeve through the system of links and dogs causes the beveled noses of the dogs to bear against the outer wall of the shiftable ring of the clutch, thereby binding between the same and the rigid wall or flange 14 of the clutch the revolvable ring. The reversal of the shiftable sleeve permits the release of the clutch.

What I claim is:—

1. In a power transmission for vehicles, comprising a drive shaft, a driven shaft, a clutch interposed therebetween, and a pivotal connection between the clutch and one of the shafts to permit bodily transverse movements between said shafts.

2. In a power transmission for vehicles, comprising a drive shaft, a driven shaft, a clutch interposed therebetween, and a link pivotally connecting the clutch to one of the shafts to permit bodily transverse movements between said shafts.

3. In a power transmission for vehicles, comprising a drive shaft, a driven shaft, a clutch interposed therebetween and rigidly connected to one of said shafts, and a pivotal connection between the clutch and the other of said shafts to permit bodily transverse movements between said shafts.

4. In a power transmission for vehicles, comprising a drive shaft, a driven shaft, a clutch interposed therebetween and rigidly connected to one of said shafts, and a link pivotally connecting the clutch to the other of said shafts to permit bodily transverse shifting movements between said shafts.

5. In a power transmission for vehicles, comprising a drive shaft, a driven shaft, a clutch interposed therebetween and rigidly connected with the driven shaft, and a pivotal connection between the clutch and the drive shaft to permit bodily transverse movements between said shafts.

6. In a power transmission for vehicles comprising a drive shaft, a driven shaft, a clutch interposed therebetween and rigidly connected with the driven shaft, and a link pivotally connecting the clutch to the drive shaft to permit a relative bodily transverse movement between said shafts.

7. In a power transmission for vehicles comprising a drive shaft having a fly wheel at the end thereof, a driven shaft having a clutch on the end thereof adjacent the fly wheel, and a pivotal connection between the clutch and the fly wheel to permit relative bodily transverse movements between said shafts.

8. In a power transmission for vehicles, comprising a drive shaft having a fly wheel at the end thereof, a driven shaft having a clutch on the end thereof adjacent the fly wheel, and a link pivotally connecting the clutch to the fly wheel to permit bodily transverse movements between said shafts.

9. In a power transmission for vehicles, comprising a drive shaft, a driven shaft, a friction clutch rigidly carried by the driven shaft and having one of its elements freely rotatable when the clutch is disengaged, and a series of pivoted links connecting the drive shaft with the rotatable element of the clutch.

10. In a power transmission for vehicles, comprising a drive shaft, a driven shaft, a clutch interposed therebetween and having one of its elements freely rotatable when the clutch is disengaged, and a pivotal connection between the rotatable element of the clutch and one of the shafts to permit bodily transverse movements between said shafts.

11. In a power transmission for vehicles, comprising a drive shaft, a driven shaft, a clutch interposed therebetween and having one of its elements freely rotatable when the clutch is disengaged, a bronzed bearing for the rotatable element, and a pivotal connection between the rotatable element of the clutch and one of the shafts to permit bodily transverse movements between said shafts.

12. In a power transmission for vehicles, comprising a drive shaft, a driven shaft, a clutch interposed therebetween and having one of its elements freely rotatable when the clutch is disengaged, a bronzed bearing for the rotatable element, a lubricating duct through the rotatable element and communicating at its inner end with the bearing, and a pivotal connection between the rotatable element of the clutch and one of the shafts to permit relative bodily transverse shifting movements between said shafts.

In testimony whereof I have hereunto affixed my signature.

CLARENCE LEO BEST.